T. H. SCHUTT.
AIR VALVE FOR RADIATORS.
APPLICATION FILED MAY 14, 1912.

1,101,339.

Patented June 23, 1914.

Witnesses:
Oliver M. Kappler
Horace B. Fay

Inventor
Theodore H. Schutt
By J. B. Fay
Attorney

UNITED STATES PATENT OFFICE.

THEODORE H. SCHUTT, OF CLEVELAND, OHIO, ASSIGNOR TO THE BISHOP-BABCOCK-BECKER COMPANY, OF CLEVELAND, OHIO, A CORPORATION OF OHIO.

AIR-VALVE FOR RADIATORS.

1,101,339.  Specification of Letters Patent.  Patented June 23, 1914.

Application filed May 14, 1912. Serial No. 697,143.

*To all whom it may concern:*

Be it known that I, THEODORE H. SCHUTT, a citizen of the United States, and a resident of Cleveland, county of Cuyahoga, and State of Ohio, have invented a new and useful Improvement in Air-Valves for Radiators, of which the following is a specification, the principle of the invention being herein explained and the best mode in which I have contemplated applying that principle, so as to distinguish it from other inventions.

The present invention relates to an improvement in air valves for radiators, and is so constructed that it may be readily taken apart and worn parts replaced when necessary. It is also designed to be self adjusting and provision is made for the addition of a manually operable valve as well as the usual thermostatic valve. The particular thermostatic valve which is here employed is also new and a considerable improvement over those heretofore used. Although my invention is particularly adapted for use with radiators it may of course, be used in other connections. To the accomplishment of these and related ends said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
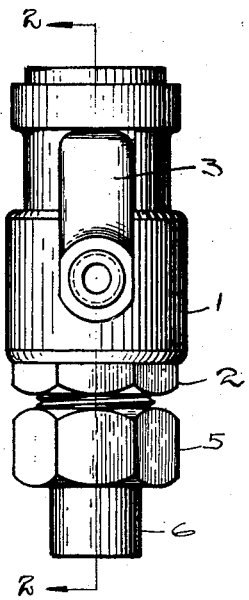
Figure 2:
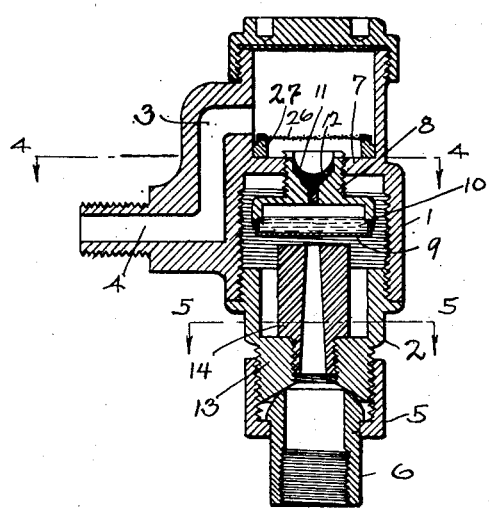
Figure 4:
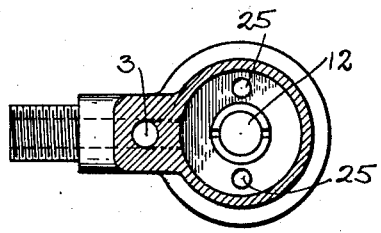
Figure 3:
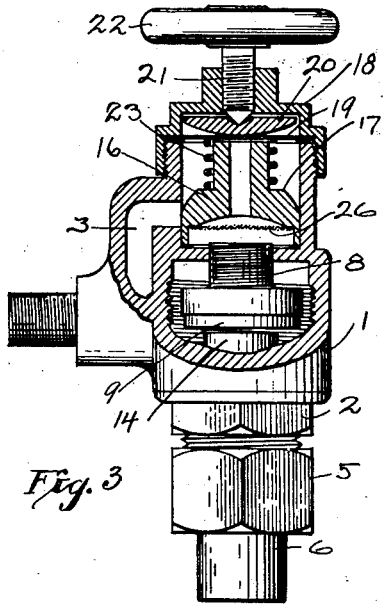
Figure 5:
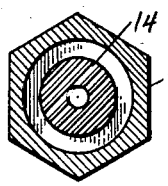

In said annexed drawing: Figure 1 is a side elevation of the radiator valve embodying the present invention; Fig. 2 is a section on the line 2—2 in Fig. 1; Fig. 3 is a view similar to Fig. 2, but only partly in section, and having a manually operated valve in addition to a thermostatic valve; Fig. 4 is a section on the line 4—4 in Fig. 2, and Fig. 5 is a section on the line 5—5 in Fig. 2.

In Figs. 1 and 2 it will be seen that my valve comprises an outer casing formed of two parts 1 and 2, the latter being externally threaded adapting it to engage the upper portion 1. The upper portion is provided with a passage 3 leading from the upper casing downwardly, and terminating in the tubular extension 4 which is externally threaded adapting it to be attached to one of the coils of the radiator. The lower portion of the casing is externally threaded adapting it to engage the cap 5 in which is held a tube 6 having its upper portion made spherical to adapt it to seat tightly against the spherical end of the lower casing 2, thus forming what is known as a ground joint. The passage 3 will of course, be the inlet passage from the radiator and will open into the upper portion of the upper casing 1 which is of considerable extent adapting it to receive the manually operable valve shown in Fig. 3, and hereinafter more fully described. The fluid from the radiator will pass from this passage 3, downwardly through the casing 1, out the inlet connection of the lower casing 2, and then to the tube itself. Between the ends of the upper casing and below the inlet opening is an inwardly projecting collar 7 having apertures 25 for the passage of the discharging fluid. The collar has also a central aperture engaged by the plug 8 which forms, with the disk 9, the stopper of the thermostatic valve and the reservoir for the expansible fluid designed to control the valve. The construction of this thermostatic valve is extremely simple. The plug 8 is first made with an aperture in its upper portion. The disk 9 is then attached to the plug, entering the groove 10 formed in the lower surface of the latter, and being held therein by a suitable material such as tin or lead. The valve is then filled to a certain point by the expansible liquid (see Fig. 2) and the small pin 11 is driven into the aperture in the upper part of the plug. To insure an absolutely sealed valve I fill the cup shaped apparatus above this pin with lead 12. On the lower casing there is a second inwardly projecting and internally threaded collar 13 which is adapted to receive an apertured valve seat 14 of tubular form and preferably of hard rubber, or other material which is adapted to soften when heated. By making this valve seat of such material it is possible for small grains of sand to be lodged upon the upper surface of the seat and yet not injure that portion of the diaphragm which forms the stopper when the latter is forced on the seat by the thermostatic fluid, since the sand will merely be embedded in the soft material. Another advantage of forming this seat of such a substance, is that should the seat be slightly warped or bent to one side, it will be possible for the stopper to force the seat into alinement, thus securing a tight closure. I am of course, aware that the use of hard rubber as seats in radiator valves is old, as it has been customary to form the seat of a long tubular portion of hard rubber which, itself is adapted to be the thermostatic valve, since rubber upon heating will expand to a certain extent and can be made to contact a suitable seat upon such expansion. In my invention I have not relied upon the rubber for the thermostatic action, although a slight expansion is found in the rubber seat when the temperature operates the thermostatic stopper.

In Fig. 3 I show a hand operated valve which comprises an open tubular body 16 seated upon the collar 7, and having a projection 17 extending laterally therefrom, and forming a shoulder. Between the cap 18 which will engage the upper casing and the casing itself, I place a thin diaphragm 19 which will normally be flexed away from the plane of its supports or upwardly. Above this diaphragm I place a member 20 which is engaged by a bolt 21, attached to the hand wheel 22, and threaded in the cap 18. By manipulating this hand wheel the member 20 is forced against the diaphragm and the latter is given the slight impetus to spring it into its lower position, thus securing and closing the opening in the tubular body 16. The spring 23 is placed around the upper portion of the neck against the diaphragm and the collar 14, and tends to force the diaphragm normally away from the opening in the collar, and will return it to its normal position upon release by the hand wheel.

It is desirable to prevent the introduction of dirt to the thermostatic valve although with the present construction the danger of cutting the valve is greatly lessened. To this end I employ a strainer 26 which in the form shown in Fig. 2 is held in an annulus 27 which is fitted snugly into the casing above the collar 7. In the form shown in Fig. 3 the strainer may be attached to the body of the tubular body 16.

By making the rubber seat 14 of smaller size than the interior of the lower casing and by rounding the top or engaging face of the seat it is possible to permit the space between the seat and the casing to completely fill with water and to almost cover the seat proper. This prevents any deposit of dirt forming on the seat, which is so common a cause of wear. The dirt will collect at the bottom of this space and may be removed by unscrewing the lower casing from the upper. My casing is designed with a view to the easy adjustment or removal of all parts as well as to a simple assembly. Other advantages are the drop inlet passage, the provision for the addition of a manually operable valve without further inconvenience than the substitution of a cap connected to such a valve for the cap shown in Fig. 2, and the construction of the manually operable and thermostatic valves.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a radiator valve, the combination of a casing having alined inlet and outlet openings, a removable cover for said casing alined with such openings, two inwardly extending and substantially alined collars mounted in said casing between such openings, a valve seat mounted in one of said collars, a thermostatic valve member mounted in the other of said collars and adapted to engage said seat, and a strainer removably mounted in said casing between such openings and upon the last-named of said collars, said strainer being removable from said casing upon removal of said cover.

2. In a radiator valve, the combination of a substantially cylindrical casing open at both ends; a cover removably attached to one end of said casing; a laterally disposed inlet opening adjacent the same end of said casing; an inwardly extending collar having apertures therethrough, said collar being mounted in said casing adjacent said inlet opening; a second inwardly projecting collar removably mounted in the opposite end of said casing; a valve seat mounted in said last named collar; a thermostatic valve member mounted in said first named collar and adapted to engage said seat when operated; and a strainer removably mounted on said first named collar between the same and said inlet opening, said strainer being removable from said casing upon removal of said cover.

Signed by me this 13" day of May, 1912.

THEODORE H. SCHUTT.

Attested by—
 Jos. H. Champ,
 Horace B. Fay.